Figure 1:
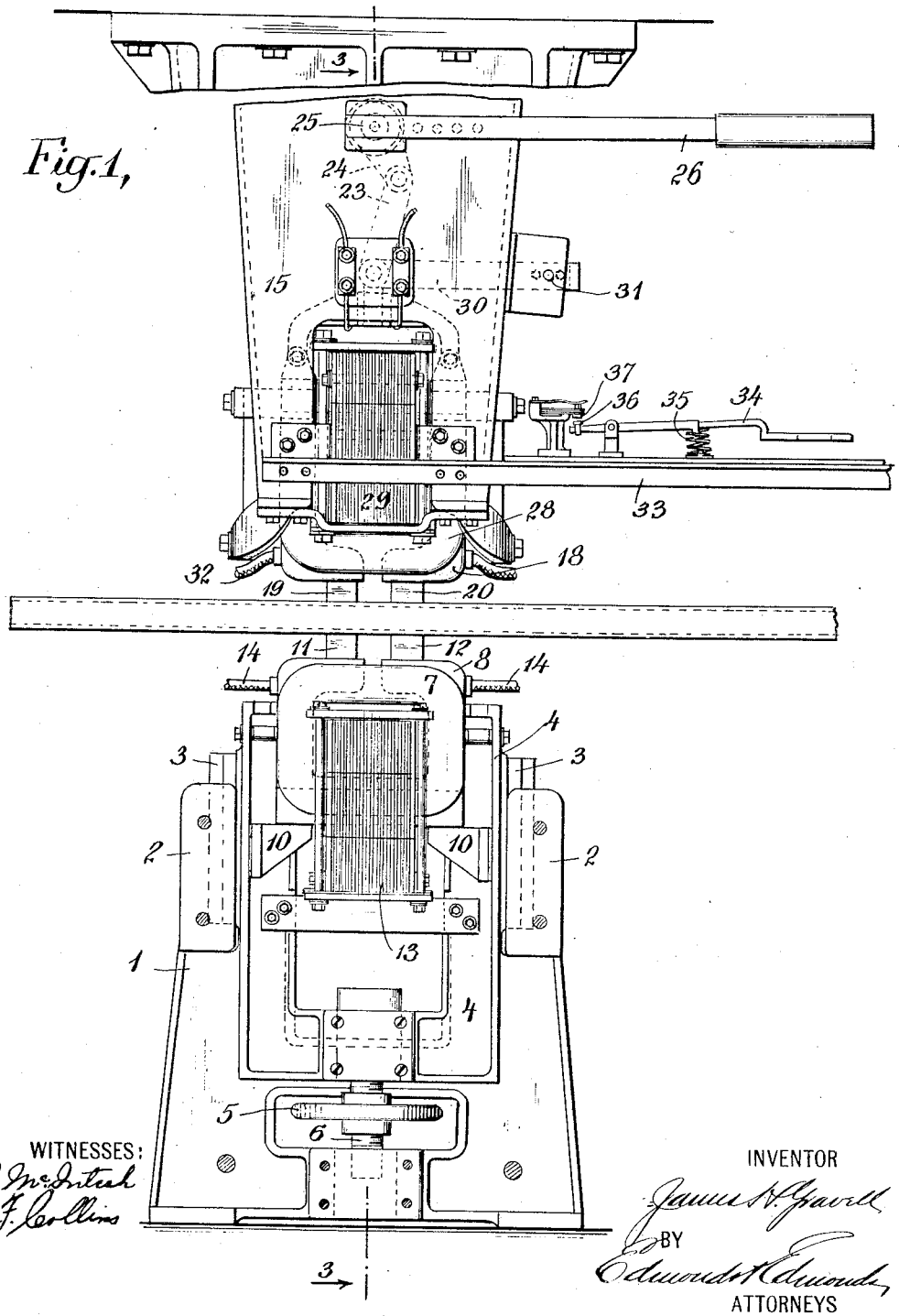

J. H. GRAVELL.
WELDING APPARATUS.
APPLICATION FILED OCT. 31, 1911.

1,041,778.

Patented Oct. 22, 1912.

6 SHEETS—SHEET 1.

WITNESSES:

INVENTOR
James H. Gravell
BY
Edmonds & Edmonds
ATTORNEYS

J. H. GRAVELL.
WELDING APPARATUS.
APPLICATION FILED OCT. 31, 1911.

1,041,778.

Patented Oct. 22, 1912.

6 SHEETS—SHEET 3.

WITNESSES:

INVENTOR

ATTORNEYS

J. H. GRAVELL.
WELDING APPARATUS.
APPLICATION FILED OCT. 31, 1911.
1,041,778.
Patented Oct. 22, 1912.
6 SHEETS—SHEET 4.
Fig. 4,
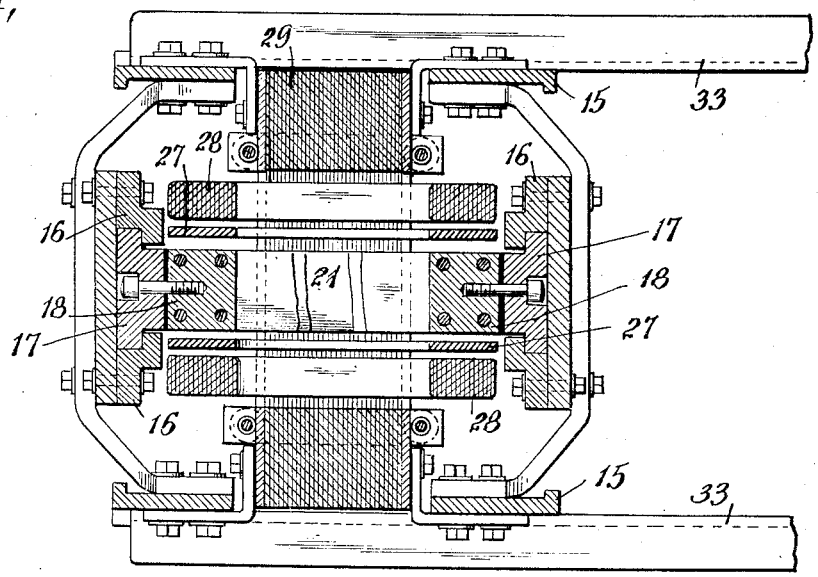
Fig. 5,
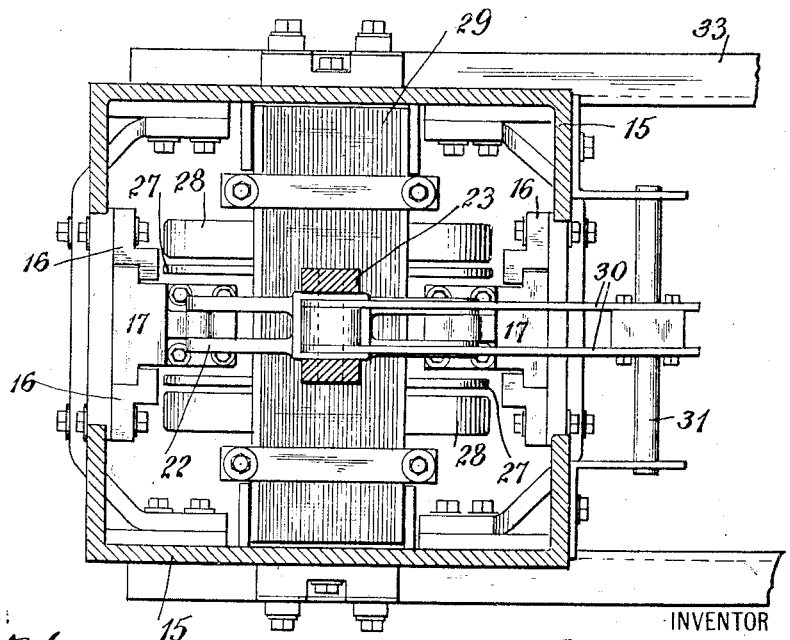
WITNESSES:
J. McIntosh
J. F. Collins
INVENTOR
James H. Gravell
BY
Edwards & Edwards
ATTORNEYS

J. H. GRAVELL.
WELDING APPARATUS.
APPLICATION FILED OCT. 31, 1911.

1,041,778.

Patented Oct. 22, 1912.
6 SHEETS—SHEET 5.

J. H. GRAVELL.
WELDING APPARATUS.
APPLICATION FILED OCT. 31, 1911.

1,041,778.

Patented Oct. 22, 1912.
6 SHEETS—SHEET 6.

WITNESSES:

INVENTOR
James H. Gravell
BY
Edmonds & Edmonds
ATTORNEYS

UNITED STATES PATENT OFFICE.

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

WELDING APPARATUS.

1,041,778.  Specification of Letters Patent.  Patented Oct. 22, 1912.

Application filed October 31, 1911. Serial No. 657,770.

*To all whom it may concern:*

Be it known that I, JAMES H. GRAVELL, a citizen of the United States, residing in the city of Philadelphia, county of Philadelphia, and State of Pennsylvania, have invented certain new and useful Improvements in Welding Apparatus, of which the following is a specification.

This invention relates to welding apparatus for use in the manufacture of metallic devices in connecting two or more metallic pieces by a welding operation.

Broadly considered, the object of the invention is to provide an electric welding-machine which is better adapted for use in the manufacture of metallic devices than those heretofore employed, with respect to economy of manual labor and of the electrical power consumed, reliability and uniformity of the welds, convenience of operation, and the range of utility of the machine.

Heretofore the electric welding-machines commonly employed have been so constructed that the welding current is led from the secondary of the transformer to and through the parts to be welded, and then back to the transformer. Such a machine is limited as to the field of its utility. For instance, with such a machine, it is impracticable to make welds at points remote from the edges of the parts to be welded, as, for example, at the center of large metal sheets, especially when the parts to be welded are of magnetic material. For use in welding such parts, the secondary circuit must be of sufficient length to permit of the introduction of the work-material, and should be of a cross-section adequate to carry large secondary current without undue heating or loss. Such a device must, therefore, be either expensive to construct or inefficient to operate. More important than this, however, when the work-material is magnetic, the lines of magnetic flux established therein by the enormous welding current react upon the circuit and materially reduce the available voltage at the secondary terminals. The magnitude of this reaction depends upon the amount of work-material embraced by the secondary circuit, and accordingly varies with the location of the weld. So great is this reaction that it is often impossible to adjust a machine so as to make satisfactory welds at the edges of the work-material as well as at a distance from the edges. With a constant supply voltage, the voltage available at the secondary terminals decreases as the point of welding recedes from the edge of the work-material. Also, as this available voltage decreases, the time required for making a satisfactory weld increases. As a consequence of this non-uniform time element, a machine of this type is not adapted for use with automatic feed-mechanism. Furthermore, when used with magnetic work-material, the magnetic reactions extend back to the supply circuit and are evidenced in a reduced power factor, which, for well known reasons, is undesirable.

One of the principal objects of this invention is to provide a welding-machine in which the secondary circuit is short and which may be used in making welds a substantial distance from the edges of the parts to be welded. To this end, two sources of supply of electric current are employed, preferably two transformers, each having a secondary consisting of a single conductor; and these two transformers are so mounted that the parts to be welded may be inserted between them and moved freely in any direction to any desired extent. When the parts to be welded are properly positioned with respect to the two pairs of secondary terminals of the two transformers, one or both of those two pairs of terminals are moved so that all of the terminals contact with the parts to be welded, those of one transformer being opposite those of the other. Then when the current is caused to flow in the two secondary coils, it flows from one secondary through the parts to be welded at one point thereon, then to the other secondary and through it in series, then through the parts to be welded at another point thereon, and back to the first secondary. In this way, a number of important advantages are secured. The secondary circuits are so short and so arranged with respect to the work-material that the impedance in the secondary circuit is small; the power factor of the circuit is therefore high, and the transformer losses correspondingly reduced. But notwithstanding the shortness of the secondaries, parts of large area may be welded and the welds made at any desired points thereon, however remote from the edges of the parts, including points inaccessible with machines of the type heretofore employed. Also, large curved pieces may be welded upon the same machine as that used for welding flat pieces. Again, such a machine may be adapted for automatic operation, as the time required to make the welds is substantially the same at all points on the surface of the parts to be welded differing as to their location with respect to the distance from the edges of the parts.

In the accompanying drawings is shown a machine embodying the invention, this being provided with two transformers adapted for operation in series in making two welds simultaneously in parts lying between the two transformers. It is to be understood, however, that the invention is not limited to the construction here shown, as it may be employed in machines differing widely from that illustrated.

Figure 2:
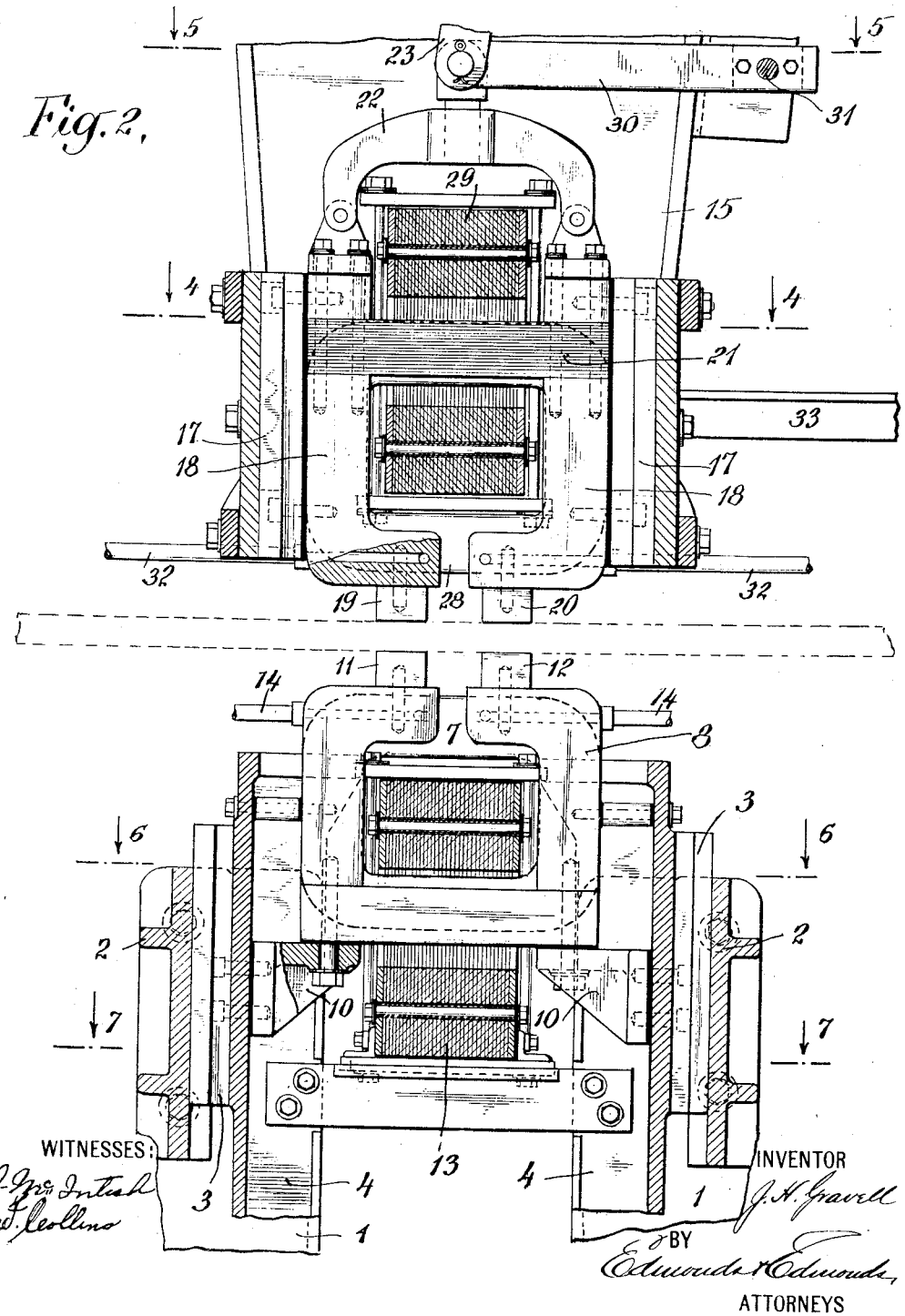
Figure 3:
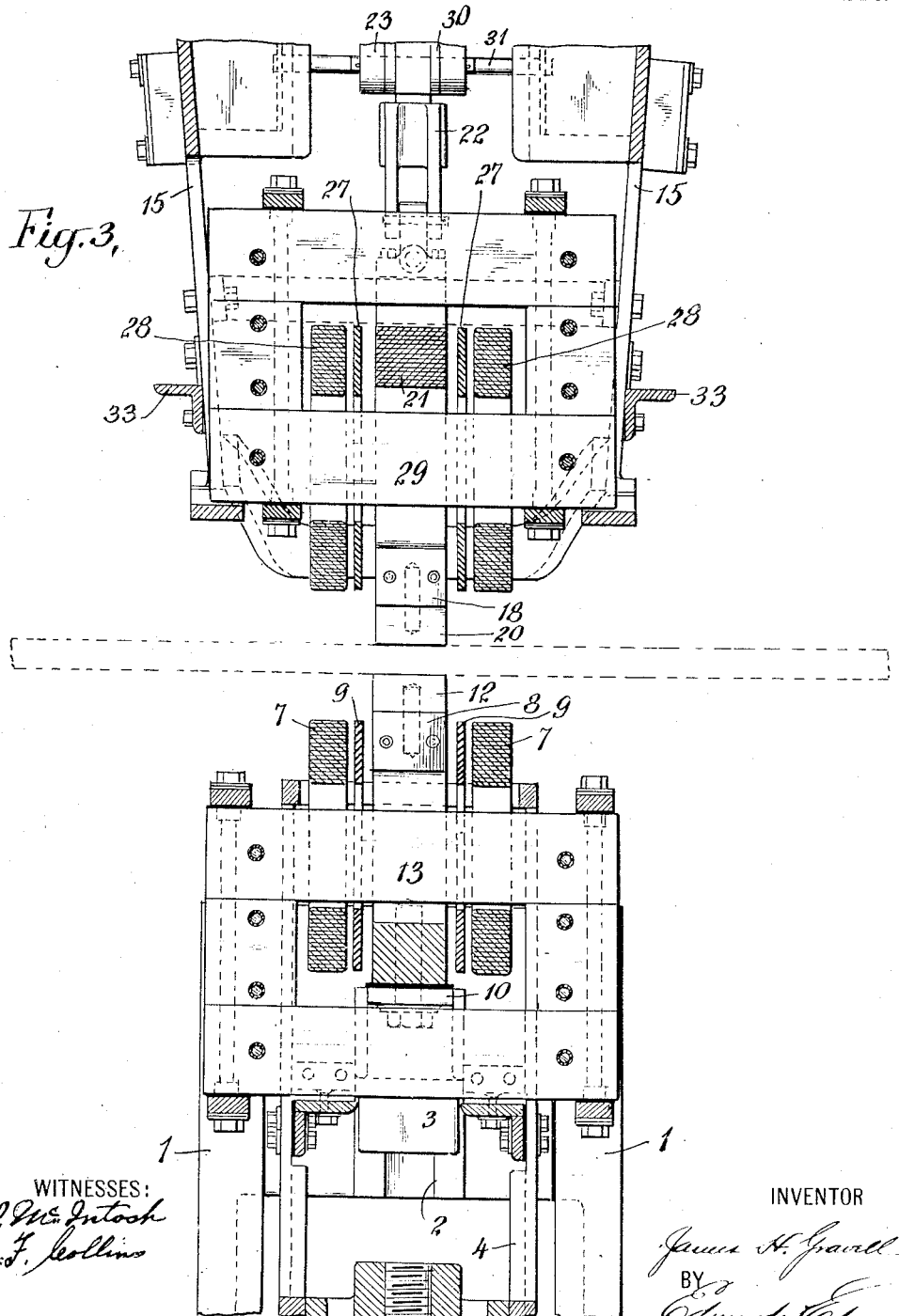
Figure 6:
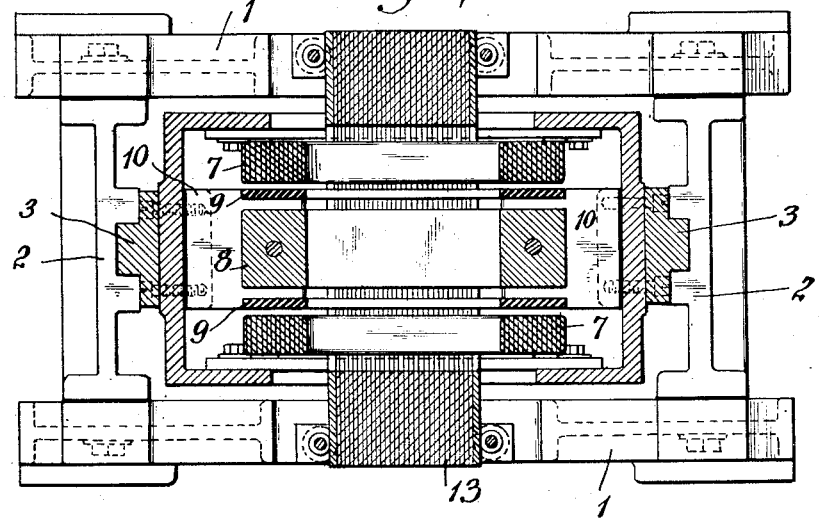
Figure 7:
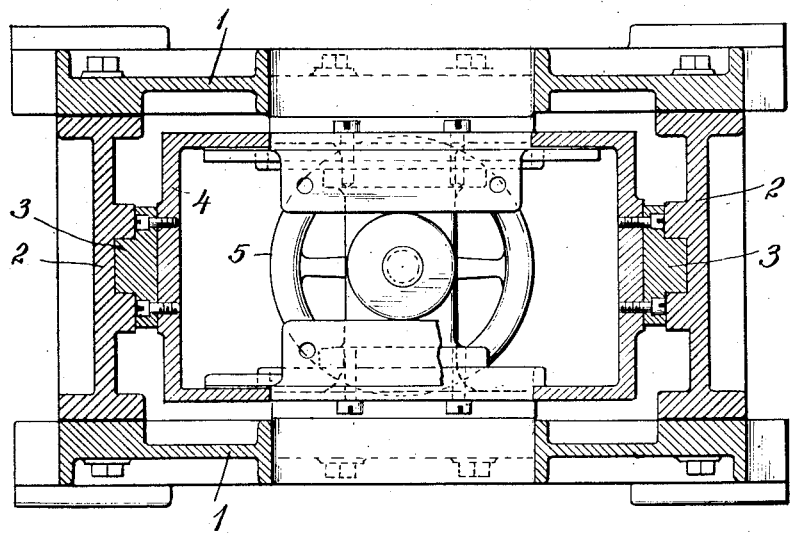
Figure 8:
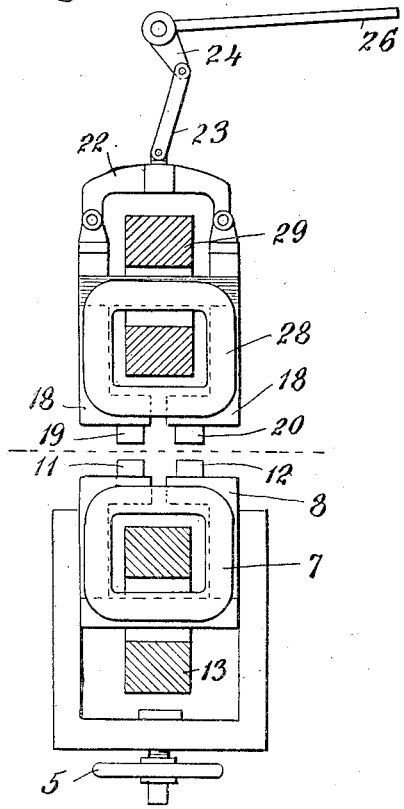
Figure 9:
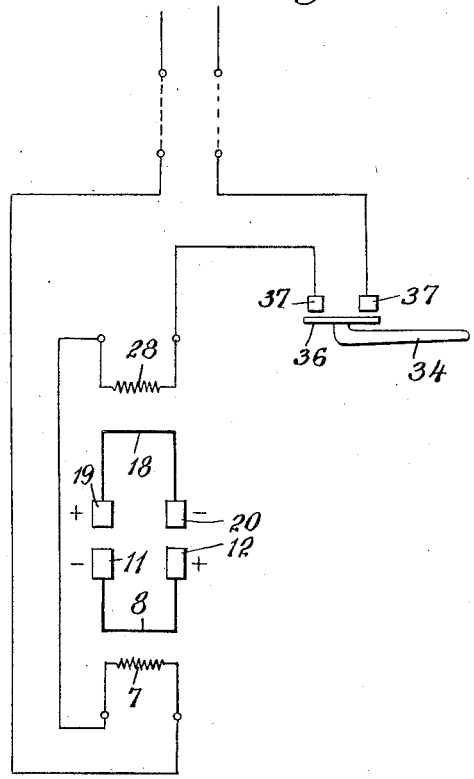
Figure 10:
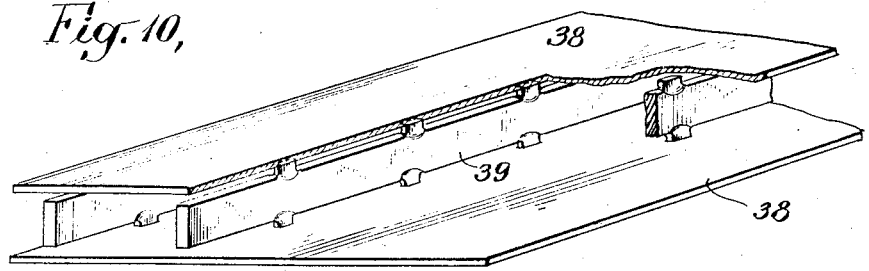

In these drawings, Figure 1 is a front view of the machine; Fig. 2 is a vertical section of the machine, broken away in part; Fig. 3 is a vertical section of the machine on a plane at right angles to the plane of Fig. 2, certain of the parts being broken away; Fig. 4 is a transverse section of the machine on line 4—4 of Fig. 2; Fig. 5 is a transverse section of the machine on line 5—5 of Fig. 2; Figs. 6 and 7 are transverse sections on lines 6—6 and 7—7 respectively of Fig. 2; Fig. 8 is a diagrammatic view of the parts employed in the machine; Fig. 9 is a diagram of the electrical connections; and Fig. 10 is a perspective view showing the parts for a metallic door adapted to be welded on the machine.

Referring to the drawings, Fig. 1 shows the complete machine in elevation. The work-material, as, for instance, the parts for a sheet-metal door, is adapted to lie in a substantially horizontal plane while the parts are being welded together, and, therefore, the machine consists of an upper half and a lower half, each half including a transformer and a pair of terminals for the secondary circuit thereof. The terminals of the transformer of the lower half project upwardly and are adapted to contact with the under side of the work-material, the vertical position of these terminals being adjustable to adapt the machine for operating on parts of various sizes. The terminals of the transformer of the upper half project downwardly and are adapted to contact with the upper surface of the work-material, and these parts may be readily raised and lowered to move them into and out of contact with the work-material at points directly opposite the terminals of the lower transformer.

Referring first to Figs. 1, 2, 3, 6 and 7, the construction employed in the lower half of the machine will be described in detail. This portion of the machine comprises a base or frame 1, upon the sides of which are formed ways 2. These ways receive slides 3 formed on a frame 4, which frame is vertically adjustable by means of a hand-wheel 5. This wheel is secured upon a reversely threaded shaft 6, one end of which enters a threaded opening in the frame 4. The frame 4 carries the coils of a transformer, consisting of primary coils 7, a secondary coil 8, and insulating material 9 placed between the two primary coils and the secondary coil, this insulating material being preferably of the same shape as the coils. The primary coils 7 may be secured to the opposite sides of frame 4, as shown in Fig. 6. The secondary coil 8 preferably consists of a single convolution of a conductor of large cross-section. It is supported by means of brackets 10, which are secured to the frame 4. At the upper ends of this single-turn coil, are terminals 11 and 12. The core 13 of this transformer may be arranged for vertical movement with the coils 7 and 8, if desired, or it may be mounted stationarily upon the frame 1, in which latter case the openings through the coils 7 and 8 would exceed in cross-section the cross-section of the upper member of the core 13 by enough to permit of the requisite vertical movement of the coils. The latter construction is employed in the machine shown, the core 13 being mounted upon the frame 1, as shown in Fig. 6. Means are preferably provided for cooling the terminals 11 and 12 and the metal of the secondary coil 8 adjacent thereto. In the drawings, pipes 14 are shown for carrying water to and from ducts provided in these parts.

Referring now to Figs. 1 to 5 inclusive, the construction of the upper half of the apparatus will be described. The frame 15 has ways 16 formed thereon, to receive slides 17 which are adapted to move vertically in these ways. These slides 17 have the secondary 18 of a transformer secured thereto, insulating material being preferably inserted between the secondary and the slides. This secondary, like the one above described, preferably consists of a single turn of conductor of large cross-section. This single-turn secondary consists of two opposite members, whose lower ends are turned toward each other and provided with terminals 19 and 20, and a flexible cross-member 21 of conducting material, whose ends are secured to the opposite side-members. The side-members are extended upwardly beyond the flexible cross-member 21, and their upper ends are engaged by or pivotally connected to an equalizer 22. To this equalizer is pivotally connected one link 23 of a toggle, the other link 24 of which is secured on a shaft 25 which carries an operating handle 26. The pivotal connection of the link 23 to the equalizer 22 is carried by arms 30, which are secured upon a rock-shaft 31 carried by suitable bearings mounted on the frame of the machine. On either side of the secondary 18 is insulating material 27, and beyond that a coil 28 of the primary of the transformer. These primary coils may be mounted in position in any suitable manner; preferably they are supported upon the frame so as not to partake of the vertical movement of the secondary. The core 29 of the transformer is mounted on the frame with one of its horizontal members passing through openings in the primary and secondary coils. This core is a laminated structure, as shown in the drawings, in accordance with the usual practice in transformers of this type.

Means are provided for cooling the ends of the secondary 18, water-pipes 32 being here shown connected to ducts formed in the ends of the secondary for carrying water thereto.

At 33 are shown bars secured to the frame 15 of the upper half of the apparatus and extending outwardly therefrom. These bars support a platform on which the operator may stand, in position to manipulate the operating lever 26. A switch is provided by which the operator may control the electrical connections while standing in this position. The switch-lever is shown at 34, pivotally mounted upon the frame 33 and normally held in the open position by a spring 35. When the lever 34 is moved against the tension of its spring, a bridging contact 36 carried thereby connects two stationary contacts 37.

The electrical connections are shown in Fig. 9, in which 7 and 28 are the primaries of the lower and upper transformers and 8 and 18 are the secondaries of those transformers, respectively. The terminals of the two secondaries are shown at 12, 11, 19 and 20. The two primaries 7 and 28 are connected in series in the same circuit, and this circuit is controlled by the contact 36 operated by the lever 34.

Fig. 8 shows the complete apparatus diagrammatically, and the operation of the machine will be readily understood by reference to this figure. The lower terminals 11 and 12 are positioned vertically with reference to the thickness of the parts to be operated upon, by turning the hand-wheel 5, and thus raising or lowering the coils of the lower transformer. This having been done, the work-material is inserted between the two pairs of terminals and moved relatively thereto, so that the terminals 11 and 12 contact with the under side of the work-material at the points where the welds are to be made. The operator then manipulates the handle 26, so as to straighten the toggle 23, 24, and cause the secondary of the upper transformer to move downwardly until the terminals 19 and 20 are carried into hard contact with the upper surface of the work-material at points directly opposite the terminals 11 and 12. If there is any inequality in the thickness of the work-material, or if for any other reason relative movement of the terminals 19 and 20 is necessary in order that they may make proper contact with the work-material, such relative movement is permitted by the flexible cross-member 21 of the secondary of the upper transformer and the equalizer 22 which lies between the operating handle 26 and the two opposite side-members of the secondary 18. The circuit of the primaries of the two transformers is then closed by the switch 34. Current will then be generated in the secondaries of the two transformers, and as these secondaries are connected in series with the work-material between them, current will flow from one secondary, as, for instance, the upper one 18, to the terminal 19, through the work-material to the terminal 11, through the secondary 8 to the terminal 12, through the work to the terminal 20 and back to the secondary 18 of the upper transformer. In this way the welding current is caused to pass through the work in two paths, between the terminals 19 and 11 and the terminals 12 and 20, and the welds at these points will be quickly made, whereupon the circuit of the primaries will be opened and the upper terminals 19 and 20 raised to free the work.

It will be seen that with this form of welding apparatus, parts of any desired area may be welded, as such parts may be moved freely between the two pairs of terminals in any direction and to any desired extent. Also, the adapting of the machine for operation upon parts of any desired dimensions is accomplished without lengthening the secondary circuits, which lengthening could be effected only with an increase in the impedance of the secondary circuits, which impedance would cut down the available welding current at the welding points to such extent as to make the welding operation uneconomical or even prohibitively expensive. Moreover, the welding operation above described is highly economical, for the reason that the welding current is, to a very large extent, confined to paths along which it is desired to make welds. It will be seen that non-adjacent terminals of different pairs, as, for instance, the terminals 12 and 19, are of substantially the same potential and of higher potential than the other two non-adjacent terminals of different pairs, 11 and 20. There is, therefore, a tendency for current from the transformer 8 to flow from the terminal 12 through the work to the terminal 11, and a tendency for current from the transformer 18 to flow from the terminal 19 through the work to the terminal 20. These two currents, flowing in opposite directions through the work, neutralize each other to a greater or less extent, so that the resultant current flowing through the work from one of the desired paths therethrough to the other is quite small. In fact, in practice, it has been found that when the metal at the welding points has been reduced to the welding temperature, it is possible to hold the finger upon the work at a point between the two sets of terminals.

Another advantage resulting from the use of the apparatus and method of operation above described is that two welds are made at each operation, so that the cost of labor involved in welding parts together is thus greatly reduced. Again, the relatively small impedance in the secondary circuits of the two transformers results in a higher power factor for the circuit than would be the case if it were attempted to adapt machines of the type heretofore employed for use in making welds at points remote from the edges of the work-material. By reason of this higher power factor, the losses in the transformers are decreased and greater economy thus secured. Again, with a machine of the type above described, it is possible to make welds in large curved pieces on the same machine as that used for operation upon flat pieces.

A further advantage of a machine of the type above described is that such a machine may be adapted for operation by power, so that a series of welds may be made, one after another, automatically. In such a machine, the power-driven devices may be arranged to move the work a definite distance, bring the terminals into contact therewith, close the circuit of the primaries of the transformers, and after a definite time interval open that circuit, disengage the terminals from the work, and again move the work. Such operation would be possible with the machine above described, and would be impracticable with machines heretofore used, at least in some cases, because with the machine here shown the time required for making the welds is substantially the same at all points over the surface of the work, whereas with the prior type of machines such time interval would vary considerably. With the machines heretofore employed, making one weld at a time, there is considerable variation in the amount of eddy currents flowing in the work at the time of the welding, due to the variation of the distance of the point of welding from the edges of the work. These eddy currents react upon the welding current so as to reduce the effective current strength. With the old type of machine, making a single weld at a time, when the welding point is close to the edges of the work the eddy currents would be crowded and restricted on one side of the welding point, and would therefore be reduced in amount, so that the welding current would flow more freely and the weld would therefore be made in less time. When, however, the weld is made at a distance from the edges of the work, the eddy currents would have a wide area to circulate in entirely around the welding point, and their increased strength would cut down the effective welding current, so that greater time would be required for making the weld. With a machine of the type here shown, two welds are made simultaneously and the eddy currents circulating in the work are substantially constant at all times, for, regardless, of the distance of the welding points from the edges of the work, these eddy currents must circulate through the restricted space between the two welding points.

The arrangement of the circuits as herein shown, with the primaries of the two transformers in series, affords special advantage. It sometimes happens that one of the secondary circuits does not become closed when it should, due to the collection of foreign substances upon the surface of the work-material or some other cause. When this occurs, there will be a tendency for the current of the other secondary circuit to flow from one terminal of that circuit to the other through the work-material, resulting in imperfect welds. But with the two primaries in series, when one of the secondary circuits does not become closed, the transformer of which that secondary forms a part constitutes a reactance in series with the primary of the other transformer and cuts down the current flowing in the circuit of the two primaries to such extent that the metal of the work-material is insufficiently heated and it becomes apparent at once that the apparatus is not properly operating.

Fig. 10 shows the parts for a sheet-metal door, which parts may be secured together with the welding apparatus above described. The parts shown consist of two flat sheet-metal plates 38 and strips 39 of sheet-metal lying between them. These strips have projections on opposite edges thereof at equal intervals along the length of the strips, with which projections the sheets 38 contact. A weld is made at each of these projections, the metal of the sheet 38 being united with the metal of the projections on the strips 39. With the machine described, two of these welds would be made at each operation and then the parts for the door would be moved along to a position in which the next two projections on a strip 39 came between the terminals of the transformer secondaries. It is often desirable to make sheet-metal doors, such as that typified in Fig. 10, of substantial dimensions. With the apparatus illustrated, it will be apparent that such door parts of large dimensions may be moved between the terminals in any direction and as far as may be necessary, in order to bring the desired welding points into proper relation with the terminals. For this reason, metallic parts of any desired size may be welded together with the apparatus, and the welds made at points as remote from the edges of the parts as the construction and size of the parts make desirable.

Having described my invention what I claim as new therein and desire to secure by Letters Patent of the United States is:

1. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs toward and away from those of the other, and two transformers each having its secondary connected to the terminals of one of said pairs, said transformers being so arranged that current flows through the parts to be welded in two paths between opposite terminals of different pairs and through the secondaries of the transformers in series, substantially as set forth.

2. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs toward and away from those of the other, and two transformers each having its secondary connected to the terminals of one of said pairs, said transformers having their primaries connected in series and their secondaries so connected that the secondary current flows through them in series and in series through the parts to be welded in two paths between opposite terminals of different pairs, substantially as set forth.

3. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of either pair simultaneously toward and away from those of the other, and two transformers each having its secondary connected to the terminals of one of said pairs, said transformers being so arranged that current flows through the parts to be welded in two paths between opposite terminals of different pairs and through the secondaries of the transformers in series, substantially as set forth.

4. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously toward and away from those of the other and for permitting a differential movement thereof, and two transformers each having its secondary connected to the terminals of one of said pairs, said transformers being so arranged that current flows through the parts to be welded in two paths between opposite terminals of different pairs and through the secondaries of the transformers in series, substantially as set forth.

5. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously in a straight line, means for moving the terminals of the other of said pairs in a straight line toward and away from said first-named pair of terminals and for permitting differential movement thereof, and two transformers each having its secondary connected to the terminals of one of said pairs, said transformers being so arranged that current flows through the parts to be welded in two paths between opposite terminals of different pairs and through the secondaries of the transformers in series, substantially as set forth.

6. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously toward and away from those of the other and for permitting a differential movement thereof and two transformers each having its secondary connected to the terminals of one of said pairs, said transformers having their primaries connected in series and their secondaries so connected that the secondary current flows through them in series and in series through the parts to be welded in two paths between opposite terminals of different pairs, substantially as set forth.

7. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously in a straight line, means for moving the terminals of the other of said pairs in a straight line toward and away from said first named pair of terminals and for permitting differential movement thereof, and two transformers each having its secondary connected to the terminals of one of said pairs, said transformers having their primaries connected in series and their secondaries so connected that the secondary current flows through them in series and in series through the parts to be welded in two paths between opposite terminals of different pairs, substantially as set forth.

8. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of one of said transformers and the terminals thereon vertically, and means for so connecting the transformers that secondary current flows through the parts to be welded in two paths between opposite terminals of different transformers and through the secondaries of the transformers in series, substantially as set forth.

9. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of one of said transformers and the terminals thereon vertically, means connecting the primaries of the transformers in series, and means for so connecting the secondaries that secondary current flows through them in series and in series through the parts to be welded in two paths between opposite terminals of different transformers, substantially as set forth.

10. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of either of said transformers with the terminals thereon vertically in a straight line toward and away from the other, and means for so connecting the transformers that secondary current flows through the parts to be welded in two paths between opposite teminals of different transformers and through the secondaries of the transformers in series, substantially as set forth.

11. In a welding apparatus, the combination of a transformer having a primary, a secondary and terminals on the ends of the secondary and mounted in position with said terminals extending upwardly and forming a support for the work, a second transformer having a primary, a secondary and teminals on the ends of the secondary, means for supporting the second transformer from above and suspending it with its terminals directly over those of the first transformer, means for moving the secondary of one of said transformers with the terminals thereon vertically toward and away from the terminals of the other transformer and for permitting differential movement of the terminals so moved, and means for so connecting the transformers that secondary current flows through the parts to be welded in two paths between opposite terminals of different transformers and through the secondaries of the transformers in series, substantially as set forth.

substantial dimensions. With the apparatus illustrated, it will be apparent that such door parts of large dimensions may be moved between the terminals in any direction and as far as may be necessary, in order to bring the desired welding points into proper relation with the terminals. For this reason, metallic parts of any desired size may be welded together with the apparatus, and the welds made at points as remote from the edges of the parts as the construction and size of the parts make desirable.

Having described my invention what I claim as new therein and desire to secure by Letters Patent of the United States is:

1. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs toward and away from those of the other, and two transformers each having its secondary connected to the terminals of one of said pairs, said transformers being so arranged that current flows through the parts to be welded in two paths between opposite terminals of different pairs and through the secondaries of the transformers in series, substantially as set forth.

2. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs toward and away from those of the other, and two transformers each having its secondary connected to the terminals of one of said pairs, said transformers having their primaries connected in series and their secondaries so connected that the secondary current flows through them in series and in series through the parts to be welded in two paths between opposite terminals of different pairs, substantially as set forth.

3. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of either pair simultaneously toward and away from those of the other, and two transformers each having its secondary connected to the terminals of one of said pairs, said transformers being so arranged that current flows through the parts to be welded in two paths between opposite terminals of different pairs and through the secondaries of the transformers in series, substantially as set forth.

4. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously toward and away from those of the other and for permitting a differential movement thereof, and two transformers each having its secondary connected to the terminals of one of said pairs, said transformers being so arranged that current flows through the parts to be welded in two paths between opposite terminals of different pairs and through the secondaries of the transformers in series, substantially as set forth.

5. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously in a straight line, means for moving the terminals of the other of said pairs in a straight line toward and away from said first-named pair of terminals and for permitting differential movement thereof, and two transformers each having its secondary connected to the terminals of one of said pairs, said transformers being so arranged that current flows through the parts to be welded in two paths between opposite terminals of different pairs and through the secondaries of the transformers in series, substantially as set forth.

6. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously toward and away from those of the other and for permitting a differential movement thereof and two transformers each having its secondary connected to the terminals of one of said pairs, said transformers having their primaries connected in series and their secondaries so connected that the secondary current flows through them in series and in series through the parts to be welded in two paths between opposite terminals of different pairs, substantially as set forth.

7. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded opposite said terminals, means for supporting said second pair of terminals located wholly on said other side of the parts to be welded, means for moving the terminals of one of said pairs simultaneously in a straight line, means for moving the terminals of the other of said pairs in a straight line toward and away from said first named pair of terminals and for permitting differential movement thereof, and two transformers each having its secondary connected to the terminals of one of said pairs, said transformers having their primaries connected in series and their secondaries so connected that the secondary current flows through them in series and in series through the parts to be welded in two paths between opposite terminals of different pairs, substantially as set forth.

8. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of one of said transformers and the terminals thereon vertically, and means for so connecting the transformers that secondary current flows through the parts to be welded in two paths between opposite terminals of different transformers and through the secondaries of the transformers in series, substantially as set forth.

9. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of one of said transformers and the terminals thereon vertically, means connecting the primaries of the transformers in series, and means for so connecting the secondaries that secondary current flows through them in series and in series through the parts to be welded in two paths between opposite terminals of different transformers, substantially as set forth.

10. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of either of said transformers with the terminals thereon vertically in a straight line toward and away from the other, and means for so connecting the transformers that secondary current flows through the parts to be welded in two paths between opposite teminals of different transformers and through the secondaries of the transformers in series, substantially as set forth.

11. In a welding apparatus, the combination of a transformer having a primary, a secondary and terminals on the ends of the secondary and mounted in position with said terminals extending upwardly and forming a support for the work, a second transformer having a primary, a secondary and teminals on the ends of the secondary, means for supporting the second transformer from above and suspending it with its terminals directly over those of the first transformer, means for moving the secondary of one of said transformers with the terminals thereon vertically toward and away from the terminals of the other transformer and for permitting differential movement of the terminals so moved, and means for so connecting the transformers that secondary current flows through the parts to be welded in two paths between opposite terminals of different transformers and through the secondaries of the transformers in series, substantially as set forth.

12. In a welding apparatus, the combination of a transformer having a primary, a secondary and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of one of said transformers and the terminals thereon vertically toward and away from the terminals of the other transformer and for permitting differential movement of the terminals so moved, means connecting the primaries of the transformers in series, and means for so connecting the secondaries that secondary current flows through them in series and in series through the parts to be welded in two paths between opposite terminals of different transformers, substantially as set forth.

13. In a welding apparatus, the combination of a transformer having a primary, a secondary, and terminals on the ends of the secondary and mounted in position with said terminals extending upwardly and forming a support for the work, a second transformer having a primary, a secondary and terminals on the ends of the secondary, means for supporting the second transformer from above and suspending it with its terminals directly over those of the first transformer, means for moving the secondary of each of said transformers with the terminals thereon vertically toward and away from the terminals of the other transformer, means for permitting a differential movement of the terminals of one of the secondaries when the latter is so moved, means connecting the primaries of the transformers in series and means for so connecting the secondaries that secondary current flows through them in series and in series through the parts to be welded in two paths between opposite terminals of different transformers, substantially as set forth.

14. In a welding machine, a transformer having a secondary consisting of two members, a terminal on each of said members and a flexible connection between said members, an equalizer engaging said members, a toggle connected to the equalizer, means for actuating the toggle and thereby actuating the equalizer, and means for guiding the equalizer when actuated by the toggle, substantially as set forth.

15. In a welding machine, a transformer having a core and a movable secondary consisting of a single turn and having terminals on its ends, means for effecting movement of said secondary, a second transformer having a stationary core and a secondary consisting of two flexibly-connected members having terminals on their ends and capable of simultaneous straight-line movement toward the terminals of the first-named transformer, and means for effecting the movement of said members, which means is arranged to permit differential movement of said members, substantially as set forth.

16. In a welding apparatus, the combination of two pairs of terminals, means for supporting said pairs permitting free movement of the parts to be welded in any direction between them, two transformers each having its secondary connected to the terminals of one of said pairs, and means connecting the primaries of said transformers in series, substantially as set forth.

17. In a welding apparatus, the combination of two pairs of terminals, means for supporting said pairs permitting free movement of the parts to be welded in any direction between them, means for moving the terminals of one of said pairs toward and away from those of the other, two transformers each having its secondary connected to the terminals of one of said pairs, and means for connecting the primaries of the transformers in series, substantially as set forth.

18. In a welding apparatus, the combination of a pair of terminals adapted to contact with one side of the parts to be welded, means for supporting said terminals located wholly on said side of the parts to be welded, a second pair of terminals adapted to contact with the other side of the parts to be welded, means for supporting said second pair of terminals located wholly on said other side of the parts to be welded, two transformers each having its secondary connected to the terminals of one of said pairs, and means for connecting the primaries of said transformers in series, substantially as set forth.

19. In a welding apparatus, a transformer having its secondary connected to two terminals, means for moving said terminals simultaneously into contact with the parts to be welded and means for permitting said terminals to move relatively, substantially as set forth.

20. In a welding apparatus, the combination of a transformer having its secondary connected to two terminals adapted to contact with one side of the parts to be welded, means for adjusting the position of said terminals, a second transformer having its secondary connected to two terminals, means for moving the terminals of the second transformer simultaneously into contact with the other side of the parts to be welded and means for permitting said terminals to move relatively, substantially as set forth.

21. In a welding machine, a transformer having a secondary consisting of two members, a terminal on each of said members and a flexible connection between said members, an equalizer engaging said members, and an operating device connected to the equalizer for positioning said terminals, substantially as set forth.

This specification signed and witnessed this 13th day of October, 1911.

JAMES H. GRAVELL.

Witnesses:
A. B. SHOEMAKER,
C. K. OLDBERG.